United States Patent [19]

Himmelsbach

[11] 3,783,603

[45] Jan. 8, 1974

[54] CLOCK WITH OPTICALLY DISPLAYED DIGITAL TIME INDICATION

[75] Inventor: Paul Himmelsbach, Bad Kreuznach, Germany

[73] Assignee: Jos. Schneider & Co. Optishe Werke, Kreuznach, Germany

[22] Filed: June 2, 1972

[21] Appl. No.: 259,224

[30] Foreign Application Priority Data

June 4, 1971 Germany .................. P 21 27 932.3

[52] U.S. Cl. ............... 58/50 R, 58/127 R, 240/6.43

[51] Int. Cl. ...................... G04b 19/30, G04b 19/06

[58] Field of Search .................... 58/5, 50 R, 125 B, 58/127 R; 240/6.43; 340/278 B

[56] References Cited

UNITED STATES PATENTS

| | | | |
|---|---|---|---|
| 3,673,787 | 7/1972 | Kovacevic | 58/50 R |
| 2,502,985 | 4/1950 | Paulson | 58/50 |
| 2,834,250 | 5/1958 | Stefani | 58/50 R |
| 3,179,003 | 3/1965 | Tompson | 58/50 R |

*Primary Examiner*—Richard B. Wilkinson
*Assistant Examiner*—Edith Simmons Jackmon
*Attorney*—Karl F. Ross et al.

[57] ABSTRACT

A clock with two coaxial transparent or translucent disks bearing hour and minute digits, respectively, has a screen onto which the instantaneous time is projected by an optical system including an objective in line with overlapping peripheral zones of the two disks. The digits of one disk are carried on an annular ridge of its peripheral zone received in an annular depression of the other disk so that the two sets of digits lie in the same plane, the objective being focused upon that plane.

9 Claims, 4 Drawing Figures

PATENTED JAN 8 1974 3,783,603

CLOCK WITH OPTICALLY DISPLAYED DIGITAL TIME INDICATION

My present invention relates to a timepiece, such as a clock, furnishing chronological information with the aid of two disks interconnected for joint rotation at a predetermined speed ratio (e.g., 12:1 or 24:1), each disk carrying a set of peripheral markings such as hour and minute digits moving past an observation point to enable joint reading of these markings.

A direct viewing of, for example, the 60 minute markings on such a timepiece requires a disk of large diameter if the digits are to be read from a normal distance. Thus, a table clock or the like of this nature must be rather bulky in order to accommodate the disks and their driving mechanism.

The object of my present invention, therefore, is to provide means for facilitating the viewing of the markings of a compact timepiece of this character.

This object is realized, pursuant to my present invention, by focusing an optical system upon the juxtaposed portions of the disk peripheries carrying the coacting markings for projecting an enlarged image thereof onto a viewing screen.

If the markings are small, as is desirable in order to achieve the wanted compactness, the objective must have a short back-focal length in order to provide the necessary magnification. This requirement, however, creates difficulty if the peripheral zones of the coacting disks lie in different planes as will generally be the case if these disks are coaxially arranged. Thus, a more particular feature of my invention resides in a disposition of the two sets of markings on two coplanar peripheral portions of the disk, i.e., portions lying in the image plane of an objective forming part of the optical projection system.

Although, in principle, the image of the juxtaposed markings could also be projected episcopically, I prefer to use disks which are at least partly transparent or translucent along their digit-bearing zones (i.e., with opaque markings on a light-transmissive background or vice versa) so that the juxtaposed digits can be transluminated at the observation point.

Advantageously, in the case of coaxial disks, the markings of one disk are carried on a raised formation (such as an annular ridge) on a face of one disk lying in the plane of a confronting face of the other disk which may have an annular depression accommodating that formation.

The above and other features of my invention will be described in detail hereinafter with reference to the accompanying drawing in which.

Figures 1, 2, 3, 4:
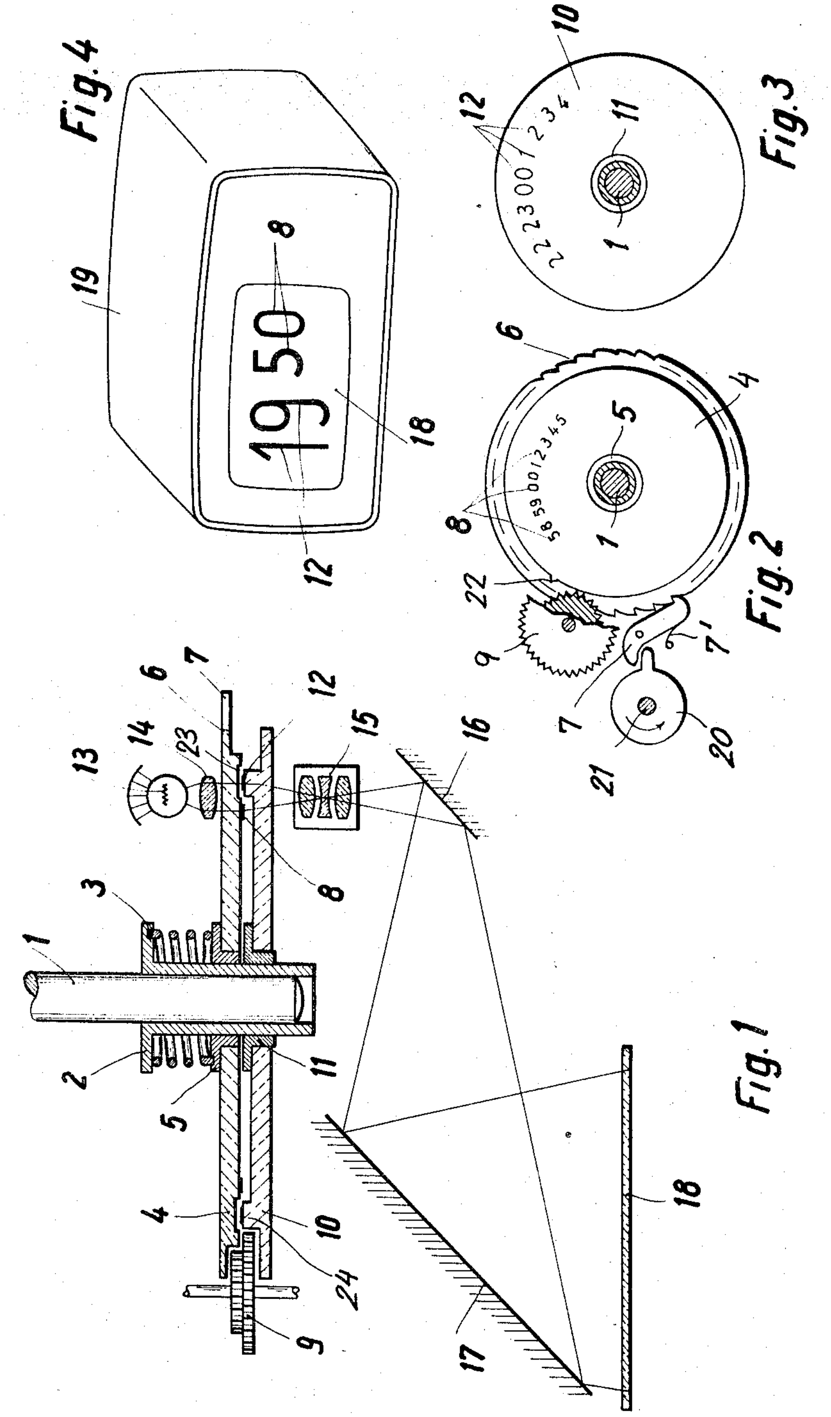
FIG. 1 is an axial sectional view of part of a clockwork provided with optical display means according to the invention.
FIGS. 2 and 3 are respective face views of a pair of digit-carrying disks formed part of the clockwork of FIG. 1.
FIG. 4 is a perspective view of a clock equipped with the system of FIG. 1.

The clockwork illustrated in FIG. 1 comprises a central shaft 1 continuously driven by a synchronous motor (not shown). Shaft 1, rotating at one revolution per hour, carries a sleeve 2 to which a surrounding coil spring 3 is anchored at one end. The other end of this spring engages a hub 5 of a transparent minute disk 4 which, as partly illustrated in FIG. 2, bears a set of digital markings 8 ranging from 00 through 59; each of these markings thus occupies a sector of 6°. The peripheral edge of disk 4 is provided with 60 ratchet teeth 6 engaged by a pawl 7 which is urged into engagement therewith by a spring 7′ and is momentarily tripped, once per second, by an escapement mechanism including a cam 20 on a shaft 21 of the clockwork rotating at 1 revolution per minute; this shaft could carry a second-indicating hand, if desired. Thus, disk 4 is entrained by spring 3 at the same average speed as shaft 1 but advances only intermittently, remaining stationary for almost a full minute between movements.

A step-down gearing 9 meshing with a single peripheral tooth 22 on disk 4 and with other gear teeth (not shown) on a coaxial, also transparent disk 10 bearing hour markings 12 as shown in FIG. 3, the disk 10 having a hub 11 freely rotatable on sleeve 2. These hour markings 12, disposed along a peripheral annular zone of slightly greater radius than that of disk 4 bearing the minute markings 8, range from 00 through 23 to provide the readings of a 24-hour clock; it will be understood that disk 10 could be stepped by disk 4 to perform one revolution every 12 hours, rather than every 24 hours as in the illustrated embodiment, or that the readings 1 through 12 and 13 through 00 might be replaced by 1 A.M. through 12 A.M. and 1 P.M. through 12 P.M., respectively.

In any event, disk 10 is stepped only once per hour (concurrently with an advance of disk 4) so that its markings are stationary most of the time.

As will be apparent from FIG. 1, minute markings 8 are disposed adjacent an annular depression 23 on a face of that disk confronting the disk 10 whose hour markings 12 are carried on an annular ridge 24 registering with depression 23 so that the two sets of digits 8 and 12 lie in a common plane, i.e., the image plane of a projection objective 15 onto which light from a lamp 13 is directed by a defocusing lens 14. The light rays transluminating the disks 4 and 10 are directed through mirrors 16 and 17 upon a screen 18 where the image of juxtaposed digits 8 and 12 is displayed with substantial magnification, e.g., in a ratio of 10:1 as illustrated in FIG. 4. Screen 18 occupies the major part of the front of a clock housing 19 within which the elements described above are disposed.

It will be apparent that the ridge 12 need not be continuous but could be subdivided into segments and that the disk 4 could be reduced in radius so that its edge lies just beyond the numerical markings 8, thus eliminating the need for the depression 23. The arrangement illustrated, however, is particularly advantageous because of its compactness and the simplicity of the disk drive; also, the light rays transluminating the markings 8 and 12 are approximately evenly attenuated by the glass or other disk material inasmuch as they all pass through both disks.

If desired, other chronological information (e.g., day of the week, calendar date or moon phase) could be registered on a further transparency juxtaposed with disks 4 and 8, in the image plane of objective 15, for simultaneous projection upon the suitably extended screen 18.

I claim:

1. A timepiece comprising:

a clockwork including two coaxial disks interconnected for joint rotation at a predetermined speed ratio, said disks having coplanar peripheral portions which are at least partly light-transmissive and carry respective sets of peripheral markings successively moving past an observation point to enable joint reading of juxtaposed markings from said disks as a chronological indication, said portions including a raised formation on a face of one of said disks in the plane of a confronting face of the other of said disks;

an objective focused upon the plane of said portions at said observation point;

a light source disposed on a side of said disks opposite said objective for transluminating said portions; and screen means illuminated by said optical means for reproducing an enlarged image of said juxtaposed markings projected thereon.

2. A timepiece comprising:

a clockwork including a shaft performing one revolution per hour and two disks freely rotatable on said shaft, said disks being interconnected for joint rotation at a predetermined speed ratio, one of said disks carrying a set of peripheral minute markings and the other of said disks carrying a set of respective hour markings successively moving past an observation point to enable joint reading of juxtaposed markings from said disks as a chronological indication;

optical means focused upon the peripheries of said disks at said observation point;

screen means illuminated by said optical means for reproducing an enlarged image of said juxtaposed markings projected thereon;

spring means linking said shaft with said one of said disks;

escapement means engaging said one of said disks for letting same rotate through 6° during a small fraction of each minute; and step-down means interconnecting said disks for advancing said other of said disks once per hour.

3. A timepiece as defined in claim 2 wherein said peripheries have coplanar portions bearing said markings, said optical means comprising an objective focused upon the plane of said portions.

4. A timepiece as defined in claim 3 wherein said disks are at least partly light-transmissive along their peripheries, said optical means further including a light source disposed on a side of said disks opposite said objective for transluminating said portions.

5. A timpiece as defined in claim 4 wherein said portions includes a raised formation on a face of one of said disks in the plane of a confronting face of the other of said disks.

6. A timepiece as defined in claim 1 wherein said confronting face is provided with an annular depression accommodating said raised formation, the markings of said other of said disks being disposed alongside said depression.

7. A timepiece as defined in claim 5 wherein said raised formation is an annular ridge.

8. A timepiece as defined in claim 2, further comprising a housing for said clockwork, said screen means forming part of said housing.

9. A timepiece as defined in claim 8 wherein said screen means occupies a major part of a front wall of said housing.

* * * * *